Patented Mar. 22, 1927.

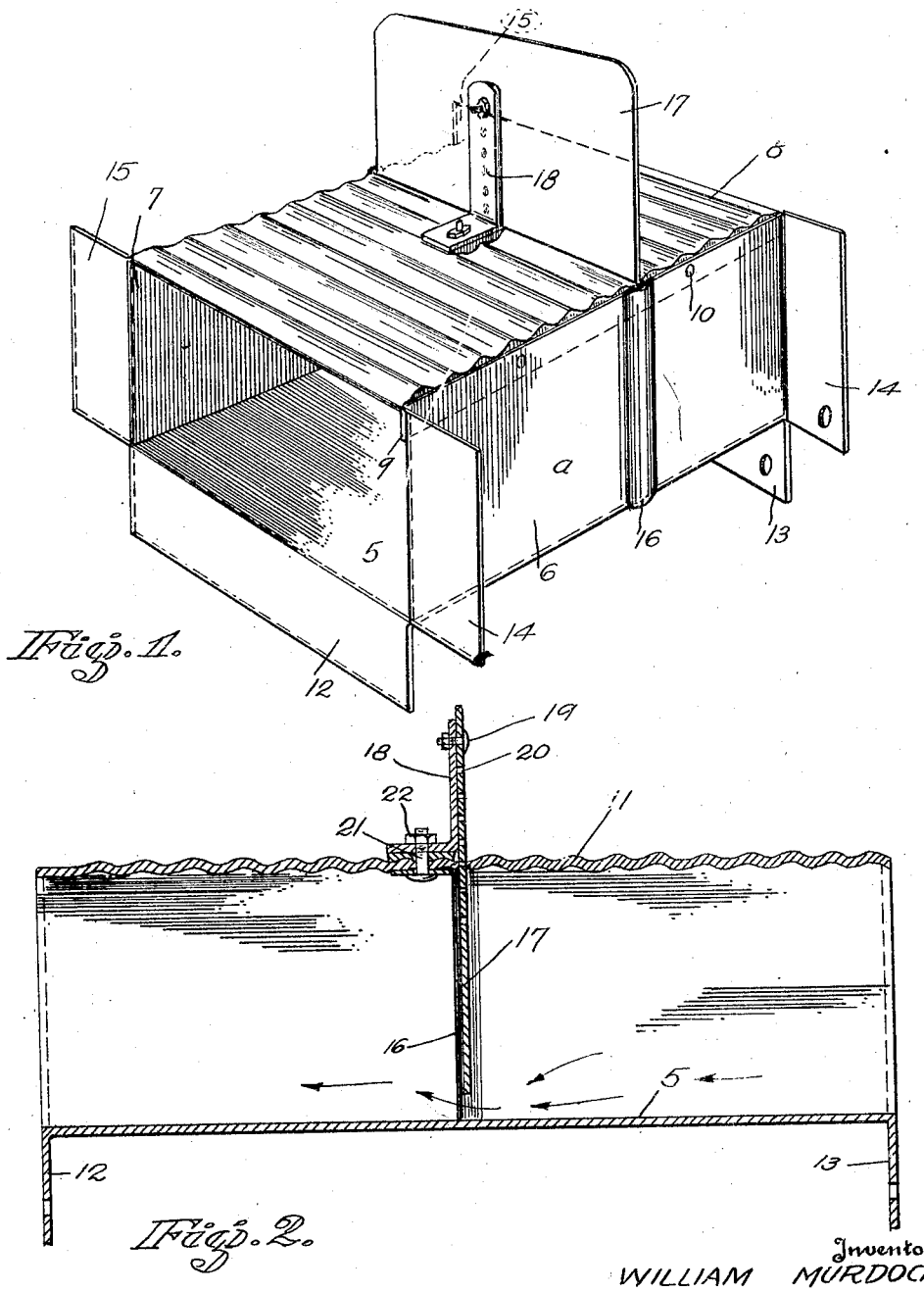

1,621,748

UNITED STATES PATENT OFFICE.

WILLIAM MURDOCK, OF DEETH, NEVADA.

HEADGATE.

Application filed August 8, 1925. Serial No. 49,119.

The present invention relates to improvements in headgates for use in connection with irrigation systems and the like.

The general object of the invention is to provide a simple, efficient and durable form of headgate which is adapted to effectively control the passage of water to the mains and laterals of an irrigation system and adapted to be firmly anchored within the ground and to withstand displacement in the event of the removal of portions of the surrounding walls of the ditch by washouts.

The above and other objects are accomplished by instrumentalities pointed out in the following specification.

The invention is clearly defined in the claim.

A satisfactory embodiment of the invention is illustrated in the accompanying drawings forming part of the specification and in which:

Figure 1 is a perspective view of the invention; and

Figure 2 is a vertical longitudinal section of the same.

The casing $a$ of the headgate of this invention is formed of a single sheet of metal of suitable gauge and preferably galvanized or otherwise processed so as to withstand corrosive action under exposure to water and air.

By preference the body $a$ is oblong and of rectangular contour both cross-sectionally and longitudinally, and of a size to nicely fit within an irrigation ditch and when so arranged to have its top flush, or substantially so, with the surface of the ground.

The bottom 5, when the device is in use, rests on the floor of the ditch, and the side walls 6 and 7 extend upwardly and are approximately in contact with the side walls of the ditch. The top 8 has a depending flange 9 which is arranged upon the upper marginal portion of the side wall 6 to which it is fixedly secured as by rivets 10, the opposite side of the top being integrally connected with the side wall 7.

As shown in Figures 1 and 2, the top 8 is transversely corrugated as indicated by 11. The presence of these corrugations has the effect of strengthening the top, and thereby enables the same to withstand the weight of stock or persons who may walk upon the casing.

Wings 12 and 13 depend from the opposite ends of the bottom 5, and laterally extending wings 14—14 and 15—15 are arranged at the ends of the side walls 6 and 7. The wings 12 and 13 are adapted to be embedded in the floor and the wings 14, 15 to be embedded in the side walls, of the ditch. When the several wings are interlocked with the bottom and side walls the casing $a$ is obviously held against longitudinal displacement; and this holding of the casing in place would continue in a case where considerable portions of the side walls or bottom of the ditch were carried away by a flood or washout.

The middle portions of the side walls 6 and 7 are transversely depressed on their inner faces to provide a guide 16 which receives the opposite side portions of a gate body 17 that is slidable vertically in a transverse recess in the top 8. When the gate body 17 is completely lowered so as to bear upon bottom 5, the gate operates to close the passage through the casing $a$, and in this position of adjustment an appreciable amount of the upper end portion of the gate projects upwardly beyond the top 8 in order to provide a convenient hand hold when manipulating the gate into open position, as shown in Figure 1.

An upright angular shaped bracket 18 is arranged upon the top 8 and the upper portion of this bracket has an opening for the loose reception of a bolt 19 which is readily insertable into any of a vertical series of spaced openings 20 in the upper portion of the gate body so that the gate may be adjustably secured in various positions of vertical adjustment. In this way, the gate operates to control not only the flow of water to the irrigation system, but also operates to vary the volume of the flow as desired. The bracket 18 may be secured to the top 8 in any preferred manner, as by means of a bolt 21, which extends upwardly through the top and the base of the bracket and is secured by a nut 22.

It will be observed that the construction of the present device is simple, and when formed of a single sheet of metal except for the gate body, the device may be manufactured at comparatively small cost.

Although I have shown and described one embodiment of my invention, it is to be understood that the same is susceptible of various changes; and I reserve the right to employ such as may come within the scope of the appended claim.

I claim:

A headgate for irrigation systems comprising a non-cylindrical open-ended metallic casing formed of a single piece of sheet metal and having a straight corrugated top provided intermediate its ends with a transversely disposed recess, vertical side walls provided intermediate their ends with vertical guides alining with the ends of the recess, and outwardly extending portions at the opposite ends of the sides and bottom, and a gate slidable within the recess of the top and within the guides of the side walls and having its upper end portion extending upwardly and beyond the top and providing a hand hold in the gate vertically from a position exteriorly of the casing, and means for securing the gate in any of its adjusted positions said means comprising a bracket secured to said corrugated top and having in a vertical portion thereof a series of apertures and a bolt through one of said apertures and said gate.

WILLIAM MURDOCK.